United States Patent [19]

Burland et al.

[11] 3,764,530

[45] Oct. 9, 1973

[54] COMPOSITION AND PROCESS FOR THE REDUCTION OF THERMAL DEGRADATION OF AQUEOUS DRILLING FLUIDS

[75] Inventors: Peter D. Burland, Metarie, La.; James L. Stephenson, Houston; Edward H. Stobart, Dayton, both of Tex.

[73] Assignee: Milchem Incorporated, Houston, Tex.

[22] Filed: Mar. 15, 1972

[21] Appl. No.: 235,082

Related U.S. Application Data

[63] Continuation-in-part of Ser. No. 96,991, Dec. 10, 1970, abandoned.

[52] U.S. Cl. ............................ 252/8.5 C, 260/80 R
[51] Int. Cl. .............................................. C10m 3/22
[58] Field of Search ................ 252/8.5 C; 260/80 R

[56] References Cited
UNITED STATES PATENTS

| 2,868,837 | 1/1959 | Burland et al. ...................... 252/8.5 |
| 2,911,365 | 11/1959 | Burland et al. ...................... 252/8.5 |
| 2,552,775 | 5/1951 | Fischer et al. ....................... 252/8.5 |

*Primary Examiner*—Herbert B. Guynn
*Attorney*—Bertram H. Mann et al.

[57] ABSTRACT

The present invention relates to a composition and process for the substantial reduction of thermal degration of aqueous drilling fluids and additives thereto by utilizing non-halogen-containing acrylic acid polymers or alkali metal or ammonium salts thereof having a weight average molecular weight no greater than about 2,500, said polymer being added to said drilling fluid in an amount from about 1 ppb to about 6 ppb.

5 Claims, No Drawings

COMPOSITION AND PROCESS FOR THE REDUCTION OF THERMAL DEGRADATION OF AQUEOUS DRILLING FLUIDS

CROSS-REFERENCE TO RELATED APPLICATIONS

This application is a continuation-in-part application of application Ser. No. 96,991, filed Dec. 10, 1970, and entitled "Composition and Process for the Reduction of Thermal Degradation of Aqueous Drilling Fluids now abandoned."

BACKGROUND OF THE INVENTION

1. Field of the Invention

The present invention relates to the use of low weight average molecular weight non-halogen-containing acrylic acid polymers and alkali metal and ammonium salts thereof as thermal degradation reduction additives for aqueous drilling fluids used in the drilling of subterranean wells.

2. Description of the Prior Art

When drilling subterranean wells in order to tap deposits of, for example, oil or gas, and in particular when utilizing a rotary drilling method comprising a bit to which is attached a drill stem, a drilling fluid is circulated to the bottom of the borehole, ejected through small openings in the drill bit at the bottom of the hole, and then returned to the surface through the annular space between the drill stem and the wall of the borehole where it may be mechanically and/or chemically treated and recirculated. When casing has been inserted into the hole, the fluid will circulate between the drill stem and the internal wall of the casing. Reverse circulation, in which the drilling fluid is injected into the hole through the annular space and returned to the surface by means of the drill stem, is sometimes utilized.

Drilling fluids serve multi-functions and must have a variety of properties. For example, a drilling fluid for utilization as discussed above must be a liquid of such viscosity that it may serve as an effective transporter of cuttings from the borehole to the surface for removal. A drilling fluid must also prevent excessive amounts of fluid from flowing from the borehole into surrounding formations by depositing on the wall of the hole a thin but substantially impervious filter cake. In addition, a drilling fluid must also be able to hold solids in suspension, preventing their return into the bit area when the circulating rate is reduced or the drilling temporarily terminated. This property is obtained by utilizing additives which will give to the drilling fluid a gel structure. A drilling fluid must also provide a high density column, exerting pressure on the surrounding formations, thus preventing possible caving of the borehole by highly pressurized oil and gas in the formation. Finally, a drilling fluid must also serve as a lubricating agent for the bearings utilized in the drill bit and on the surface of the bit teeth.

Drilling fluids are of three basic types: (1) a mud-laden fluid having an aqueous base; (2) a mud-laden fluid with a hydrocarbon, or oil, base; and (3) air or gas. Combinations of these are also used.

Aqueous, or water base drilling fluids contain water as the foundation, colloidal solids, and usually a chemical dispersant or "thinner." The water in these systems may be in the form of fresh water, salt water, or a brine. In the past, those skilled in the drilling art have relied heavily on the use of bentonite or other clayey material as the added colloidal material. This material is added to the aqueous base primarily to give to the system a thixotropic or gel structure. An ideal aqueous drilling fluid is a thixotropic colloidal system which on agiation initiated by pumping has a measurable, relatively low viscosity and is free flowing rather than plastic, especially at high temperatures. When the circulation of the system is reduced or terminated the fluid sets or gels. The rate of gel formation is sufficient to permit the cuttings to fall only a short distance before the gel structure is strong enough to support them.

One of the principal problems in producing effective and consistent aqueous drilling fluids is the production of a system having satisfactory dispersibility and the necessary thixotropic properties discussed above. However, as the drilling proceeds through different strata, the viscosity and gel strength attributed to the colloidal material, i.e., bentonite, may be affected by the character of the drilled strata, by loss or absorption of water in the porous strata or in the inflow of water and other fluids, by chemically active substances which may enter the drilling fluid as the drilling proceeds, and particularly by temperature and pressure increases as hole depth increases. As these activities affect viscosity and increase gels, "thinners" are added to the system from time to time.

Phosphate-containing materials have been successfully utilized for thinning aqueous drilling fluids. Treatment with these materials results in deflocculating colloidal clay and drilled solids in the drilling fluid, permitting higher mud density, lower viscosity and gels, reduced filter loss, and thinner filter cakes. Tannins are sometimes added with phosphates and polyphosphates to aid in the deflocculation or "thinning" phenomena. However, these polyphosphate materials are generally unstable at high temperatures encountered in many deep holes and, as a result, lose their effectiveness as thinners.

Lignite, a readily available raw material, has been used in aqueous drilling fluids to control thixotropy. Its usefulness as a thinner has been limited because it is rendered much less effective by commonly encountered mud contaminants such as sodium chloride and calcium materials such as gypsum and the like. These contaminants will progressively precipitate the lignite so that it can no longer exert its desired protective colloidal action. Though less susceptible to temperature degradation than polyphosphates, lignites have been proven to also be less effective as increased temperatures and pressures are encountered.

Lignin macromolecules, especially in the form of lignosulfonates, have been particularly useful in the thinning of clay based aqueous systems. Although calcium lignosulfonate has been utilized in lime-treated muds, sodium lignosulfonates and lignosulfonates having present chromium have become particularly useful. These materials have been found to be useful in fluids to which calcium sulfate has been added. These materials have been found not only to provide viscosity reduction but also to prevent excessive loss of fluid into porous formations. Their utilization has been extended to a variety of fluids designed to limit hydration of clay and shale.

Lignosulfonates, as a class, show severe thermal degradation at temperatures of 375°F and higher. There is some deterioration of the lignosulfonate at temperatures below 375°F. It is theoretically possible to use these additives at formation temperatures in the 400°F to 450°F range, if the circulating temperature does not exceed 375°F. However, when circulation is stopped, mud in the bottom of the hole will reach a temperature above the working range of the lignosulfonate, and become flocculated and lose filtration control. A solution to drilling a deep, hot well might be to discontinue use of lignosulfonates when formation temperatures approach 350°F and gradually treat the system with lignite, if no severe contamination is expected.

It is a fundamental geological fact that holes get hotter as they get deeper. As the temperature soars, sometimes into the 500°F range and higher, chemical reactions will affect filtration, viscosity, and shear strength of mud systems. Phosphates begin to lose their effectiveness as thinners at around 130°F to 15°F. Starches and CMC begin to lose their effectiveness as viscosity and filtration controls from between 200°F to 260°F while the lignosulfonates, as stated above, begin to degrade at 375°F to 425°F.

Increasing temperatures and pressures resulting from deeper penetrations drastically increase the flow resistance of the drilling fluid. As a result of temperature degradation of the drilling fluid, a considerable increase in pump pressure is required to move the fluid through the drill pipe. The energy deliverable to the bit is drastically reduced.

The unsatifactory performance of conventional water base fluids at elevated temperatures may be attributed to several factors, one of which is thermal degradation of additives. Some additives in themselves may be detrimental to drilling fluid properties and eventually result in high temperature solidification. Additives are consumed and must be replaced as drilling continues. Consumption of drilling fluid additives is first evidenced by a significant increase in maintenance requirements. As the bottom-hole temperature increases these requirements may approach total replacement of all unstable additives for each circulation of the drilling fluid through the hole.

Other serious difficulties may arise as a result of drilling fluid exposure to high temperatures and pressures. For example, high temperature solidification or excessive gel strengths attributed thereto can be responsible for pressure surges, swabbing, and the like. These conditions are conducive to loss of circulation. In addition, logging tools may be prevented from reaching bottom because of the excessive gel strengths. These difficulties and the need for extensive mud conditioning after trips can add up to an appreciable amount of lost rig time.

The principles of drilling fluid control were formulated a quarter century ago. From this foundation, special drilling fluids and additives must be developed that will contribute to the efficient and effective drilling of wells at temperatures approaching 500°F which can be expected to be encountered at about 30,000 feet.

High molecular weight polymers and copolymers of carboxylic acid derived materials have found a variety of uses as drilling fluid additives. These materials have appeared in the form of hydrolyzed and partially hydrolyzed gels or semi-liquids. They have been particularly useful as filtration control agents. Of particular importance is U.S. Pat. No. 3,072,569 which teaches the use of a small amount of a substantially homogeneous linear hydrocarbon chain polymer of relatively high molecular weight, as determined by its specific viscosity, containing predominantly hydrophilic hydroxyl groups and a lesser number of carboxylic acid groups as a filtration control agent for high calcium-containing drilling fluids. Preferably employed are hydrolyzed polymers derived from vinyl acetate and a lower alkyl acrylate such as ethylacrylate and equivalents thereof wherein the molar ratio of polyvinyl alcohol to alkali metal polyacrylate formed during the polymerization and subsequent alkaline hydrolysis resulting in hydroxyl and carboxylic acid groups is in the range of from 70–90 to 30–10, respectively.

Low molecular weight telomers such as those disclosed in U.S. Pat. No. 2,911,365 wherein the telomers are of a monomeric material selected from the class consisting of acrylic acid, its alkali metal and ammonium salts and acrylamide and a halogenated alkene, have also been utilized.

In U.S. Pat. No. 2,911,365 it is stated that "the reaction products of the invention are neither simple addition products nor interpolymers. Interpolymers result from a number of molecules of each reactant entering into the polymer chain and the product is a high molecular weight polymeric material. In the reaction products of the invention, however, only one molecule of the halo methane compound enters into the formation of each molecular species and the average molecular weight of the product is, in general, considerably lower than that of an interpolymer formed under comparable conditions. The novel compositions of the invention, therefore, have special properties not to be found in the conventional acrylic acid polymers of the prior art which makes them particularly desirable in certain applications." Thus, to prepare this telomer, a halo methane material must be utilized. Although not fully understood, it is believed that the introduction of a halo methane material to produce a telomer renders it less effective as a thermal degradation agent when compared to the utilization of non-halogen-containing low molecular weight acrylic polymers. This can be readily understood by examination of the chemical structure of a polymer and of a telomer. For example, when a mercaptan, such as thioglycolic acid, is utilized in the reaction to prepare a low molecular weight acrylic polymer, the structure is as follows:

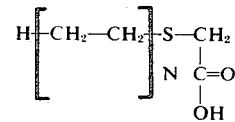

wherein N is the degree of polymerization. In comparison, when preparing a telomer and utilizing a halogen-containing material such as carbon tetrachloride in the reaction, the structure will be as follows:

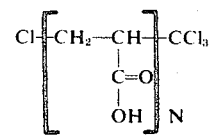

wherein N is the degree of telomerization. It is believed that the methyl chloride portion of a telomer does not play a positive role in the thermal degradation prevention reaction. In fact, as stated above, we believe that the halogen-containing portion of the telomer is deleterious to its high temperature stability and ability to prevent thermal degradation at increased temperatures and pressures over prolonged periods of time. Additionally, we believe to be of particular importance the fact that low molecular weight acrylic acid polymer chains are terminated by hydroxyl-containing members renders it substantially more effective at high temperatures. A halogen-containing-telomer chain is terminated by a non-hydroxyl grouping. The hydroxyl group are believed to play an important role in the ability of the low molecular weight polymers to effectively function at extremely high temperatures.

Since the ability of our polymeric materials to prevent thermal degradation is believed to at least partly depend upon electrolytic charges, it is important to note that acrylic polymers do not contain amides or nitriles in the polymer chain structure whereas a telomer containing a halogen such as carbon tetrachloride, will start with acrylonitrile which is later hydrolyzed after polymerization. Since hydrolysis will not be complete, it is believed that amide and nitrile groups will be randomly scattered throughout the carboxyl groups in the base telomer. Since these charges are cationic, they may interfere with the telomer's compatibility with drilling fluid additives at increased temperatures.

It has been found that the telomer materials are effective as dispersants or thinners only at moderate temperatures. At increased temperatures and pressures, these materials are ineffective, become plastic, and will not prevent thermal degradation of the drilling fluid. Although acrylic-derived polymers having a weight average molecular weight of 5,000 and higher have been utilized in drilling fluids, they have been ineffective as thermal degradation preventatives. Until the discovery of the present invention, utilization in aqueous drilling fluids of non-halogen-containing acrylic acid polymers or alkali metal or ammonium salts thereof having a weight average molecular weight of not more than about 2,500 was unknown.

We have discovered that the use of extremely low molecular weight polymers of non-halogen-containing acrylic acid or alkali metal or ammonium salts thereof will enhance and extend the "life" of aqueous drilling fluids and additives incorporated therein by substantially reducing thermal degradation. The use of our material and process will greatly reduce thermal degradation of aqueous drilling fluids and will remedy many of the problems attributed to thermal and pressure decomposition as discussed above.

It is, therefore, an object of the present invention to provide a drilling fluid additive to reduce thermal degradation.

It is a further object of the present invention to provide a drilling fluid composition useful in high temperature, high pressure environments.

It is also an object of the present invention to provide a process for the substantial reduction of thermal degradation of aqueous drilling fluids and additives utilized therein.

It is also an object of the present invention to provide a method of drilling a subterranean well.

Other objects and advantages of the use of the present additive, composition, and process will be apparent from a reading of the disclosure, examples, and claims which follow.

SUMMARY OF THE INVENTION

The present invention relates to a composition and process for the substantial reduction of thermal degradation of aqueous drilling fluids by utilizing a non-halogen-containing acrylic acid polymer of alkali metal or ammonium salt thereof having a weight average molecular weight no greater than about 2,500, said polymer being added to said drilling fluid in an amount from about 1 ppb to about 6 ppb.

DESCRIPTION OF THE PREFERRED EMBODIMENTS

We have discovered that extremely low molecular weight non-halogen-containing polymers of acrylic acid and alkali metal and ammonium salts thereof are quite beneficial in extending the high temperature effectiveness of aqueous drilling fluids by preventing thermal degradation thereof. By "thermal degradation," we mean the susceptibility of aqueous drilling fluids and additives therein to decompose or to otherwise become ineffective under exposure to extremely high temperatures and pressures resulting in substantial impairment of all drilling fluid characteristics, particularly rheology.

Any non-halogen-containing acrylic acid polymer or alkali metal or ammonium salt thereof having a weight average molecular weight of not more than about 2,500 may be utilized. Conventional polymerization techniques which will yield low molecular weight non-halogen-containing acrylic acid polymers or alkali metal or ammonium salts thereof may be utilized. These techniques generally involve use of solvents, catalysts, and chain transfer agents, or "stoppers" and are conducted at temperatures from about 20°C to 100°C. Solvents such as water, ethylene glycol or dimethyl formamide may be used. Catalysts such as alkali metal persulfates or ammonia-based persulfates can be successfully used. Chain stoppers such as thioglycolic acid or 2-mercaptoethanol are readily available and are convenient and relatively economical reactants. Additionally, primary mercaptans which are prepared by the reaction of an alkyl halide with sodium or potassium hydrosulfide are known to the art and can be utilized to prepare low molecular weight polymers. An acetyl mercaptan which is prepared by reacting an alkyl halide with potassium thioacetate can also be utilized. Thiols such as Butanethiol, 2-Propanethiol, Butanethiol, t-Butyl mercaptan, t-Octyl mercaptan, 2-Ethoxypropanethiol, Hexanethiol, Octanethiol, Thiolbenzoic acid, Thiolacetic acid, Thiophenol, p-Ethoxythiophenol, Benzyl mercaptan, Dodecanethiol, Octadecanethiol, Ethyl thioglycolate may also be utilized. A thermal degradation additive having excellent characteristics may be preferably obtained by reacting acrylic acid, thioglycolic acid, and ammonium persulfate under controlled conditions.

A non-halogen-containing acrylic polymer for use in the present invention may be obtained by the simultaneous reaction of acrylic acid in the presence of a mercaptan, such as thioglycolic acid, and ammonium persulfate or other known and similar catalytic initiator at temperatures ranging from about room temperature to about 80°C. The reaction is exothermic and it is normally conducted in a solution. Any solvent or solvent system may be used which will dissolve the reactants without reacting in any substantial amount with the reactants. For example, water, ethylene glycol or dimethyl formamide may be utilized as satisfactory solvents.

The starting monomer may be any grade of commercially available acrylic acid. An excellent starting monomer is glacial acrylic acid. The actual amount of acrylic acid utilized will depend on the cooling process available for control of the reaction exotherm. If no cooling is available, it is preferable to react about 5 percent to about 10 percent of acrylic acid by weight of the total solvent system. If cooling water is available, somewhat more acrylic acid may be reacted.

The amounts of chain stopper and reaction catalyst to be utilized are readily determined by the charge weight or amount of acrylic acid used. For example, an amount of thioglycolic acid obtained as a 98 percent pure vacuum distilled material may be used in an amount ranging from about 2 to about 15 percent by weight of the acrylic acid. When using thioglycolic acid as the chain stopper, about 12 percent by weight thioglycolic acid based upon the weight of acrylic acid is preferred. The reaction initiator utilized is preferably a commercially available technical grade. For example, about 2 to 5 percent by weight ammonium persulfate based upon the weight of acrylic acid can be used, and about 4 percent of this reactant is preferred.

The non-halogen-containing polymer should have a weight average molecular weight in the range of 500 to 2,500. Molecular weight can be determined using a Hitachi Perkin-Elmer Model 115 Vapor Pressure Osmometer. A sample of the non-halogen-containing polymer can be evaporated to dryness and dissolved in N, N-dimethylformamide, and filtered to remove inorganic residuals. This solution can be made to a known concentration. The imbalance of two thermistors is measured across a pair of thermistor beads calibrated on a series of varying concentrations of benzil (MW 210) in the same solvent at main oven setting of 55°C, and sub-oven setting of 50°C. Typically, the polymer at a level of 25 to 30 percent solids by weight will have a pH of about 2 and a viscosity ranging from about 6 cp to about 20 cp. As used herein, viscosities are usually determined at 25°C or 30°C using a Fann Viscometer rotating at 300 rpm. If the acidity of the polymer is neutralized, for purposes of convenient handling, to at least 70 percent based on acrylic content and the resulting solution is diluted to 6.5 percent solids, preferably a measurement of only 1.16 centipoises can be obtained at 30°C on a Fann Viscometer. This value is not much greater than a solution of ordinary electrolyte in water would have, or of water alone.

Although the low molecular weight, low viscosity non-halogen-containing acrylic polymer as prepared in Example 1 is preferably utilized in accordance with the present invention, other non-halogen-containing acrylic polymers and alkali metal or ammonium salts thereof will be satisfactory. Nevertheless, the weight average molecular weight of the selected acrylic polymer should not be over about 2,500. As molecular weight is increased, water solubility will decrease and the material will lose its dispersing and thermal extension characteristics. In fact, if a material is utilized having an increased molecular weight, flocculation of colloidal particles is likely to occur, contributing to undesirable increased gels at high temperatures and pressures, and may actually contribute to thermal degradation.

The polymer may be used in its acidic form or an alkali metal or ammonium salt may be used. Alkali metals such as sodium, potassium and lithium may be used as well as ammonium salts such as ammonium hydroxide.

Our invention also incorporates a process for reducing thermal degradation of aqueous drilling fluids and additives thereof. The amount of non-halogen-containing acrylic polymer or alkali metal or ammonium salt thereof utilized will vary with the particular drilling environment at hand. Formation characteristics, borehole properties, drilling depth, contaminants, temperatures and pressures encountered, and drilling fluid weight will influence the determination of quantities of acrylic material to be utilized in order to achieve the desired effect. In addition, the particular properties of the selected acrylic polymer will also influence the determination of quantities needed in the process. Because of this it is impossible to specifically state nominal usage levels under all environments. Those skilled in the art of drilling will be able to easily determine needed ratios by testing samples obtained from the borehole, checking formation characteristics, temperatures and pressures, and by otherwise determining the rheological properties that will be required. Nevertheless, it can be stated that, under most high temperature drilling conditions, about a 3 ppb (pounds per barrel) treatment should be sufficient. It is possible under some circumstances to utilize concentrations as low as about 1 ppb or as high as about 6 ppb. The non-halogen-containing polymer may be added to the drilling fluid as a pretreatment or may be added in predetermined quantities to the drilling fluid and thereafter circulating the fluid in the well bore. The polymer is readily adaptable to all drilling environments, being effective in fresh water, salt solutions, and in brines. A variety of drilling fluid additives may be utilized in the drilling fluid treated for reduction of thermal degradation with the acrylic polymer. For example, lignosulfonates, starch, bentonite, barite, lignite, quebracho, carboxymethylcellulose, and other commonly utilized additives may form the drilling fluid to which is additionally added for prevention of thermal degradation the present polymer. Generally speaking, the drilling fluid of the present invention will have an aqueous base and will have clayey material suspended therein.

The following examples will further illustrate the novel quantities of the process and additive of the present invention.

EXAMPLE I

The present example shows a preparation of a preferred non-halogen-containing acrylic acid polymer (sodium salt). Forty grams of a glacial acrylic acid (200 ppm methyl ether of hydroquinone inhibitor) was added to 400 grams of deionized water in a beaker, and 0.2 cc of a 6 percent solution of $FeCl_3$ was added to provide about 10 ppm $F^{+++}$. Six grams of thioglycolic acid (Evans 98 percent vacuum distilled) was added to provide about 15 percent based on the acrylic acid charge weight. Eight grams of a 10 percent solution of ammonium persulfate was added to the beaker incrementally at room temperature to give an amount of ammonium persulfate equal to 2 percent based on the acrylic acid charge weight. A reaction exotherm of 19°C was obtained over a 5-minute period. The beaker was allowed to cool to room temperature. A fresh charge of acrylic acid in an amount of 8.8 percent of the weight of the beaker contents was then added, followed by another charge of thioglycolic acid equal to 15 percent of the weight of the incoming charge, and 2 percent of the ammonium persulfate based on the new acrylic charge was added. No more catalyst ion was needed. After cooling the beaker contents, the procedure was repeated again with 10 percent of acrylic acid based on the new beaker contents, and 15 percent thioglycolic acid and 2 percent ammonium persulfate based on the acrylic charge. The solids content of the acrylic composition was 26.5 percent by weight and the viscosity was less than 10 cp. The total charge weight was neutralized to a pH of 6.5 with 76 grams sodium hydroxide pellets. This neutralized composition then contained 30 percent total solids by weight and its viscosity was 29 cp as measured at 23°C at 300 rpm on a Fann Viscometer.

EXAMPLE II

We are aware of U.S. Pat. Nos. 2,868,837 and 2,911,365, a co-inventor of which is a co-inventor of the present invention, in which the preparation and use of an acrylic telomer is disclosed. Although this material unquestionably is effective as an extender in temperature ranges at 300°F to 350°F, its effectiveness is not noticeable at temperatures of 450°F under extremely high pressures. Somewhere between these temperatures the ability of the telomer to prevent thermal degradation of the drilling fluid and additives therein is drastically reduced whereas use of our non-halogen containing polymer is extremely effective at 450°F and higher.

To prepare such a telomer for comparative purposes, we followed Example I of U.S. Pat. No. 2,868,837. Briefly stated, the preparation was as follows: into an autoclave was charged 2,577.6 grams of carbon tetrachloride, 222.4 grams acrylonitrile and 3.3536 grams of benzoyl peroxide. The autoclave was sealed and heated to 100°C and rocked for 5 hours. The autoclave was then allowed to cool to room temperature. The reactants were removed from the autoclave and filtered using a Buchner funnel. The telomer was allowed to dry at 80°C for 40 hours. The dry telomer was hydrolyzed by first placing 100 grams of the telomer in a 3 liter flask containing 750 grams of water. Two hundred fifty grams of water containing 73 grams of sodium hydroxide were added to the flask. The slurry was heated slowly to boiling and refluxed for 11 hours.

The telomer was evaluated for reduction of high temperature degradation by utilizing 3 ppb in two field aqueous base muds. Mud A was a field mud utilized in the actual drilling of an oil well in Mississippi. The mud contained 10 ppb lignosulfonate and was weighted to 10 pounds per gallon. Mud B was also a field mud which had been utilized in Mississippi. This mud contained 1.6 ppb lignosulfonate additive and was weighted to 9.6 pounds per gallon.

The telomer samples were added to the muds and stirred for ten minutes using a Hamilton Beach Blender. A Model 35 Fann Viscometer was immediately utilized to determine initial rheological properties of the samples. Fann viscometers are of the concentric cylinder type where the test fluid is contained in an annular space between cylinders. Rotation of the outer cylinder at known velocities is accomplished through precision gearing, causing a torque to be transmitted to the inner cylinder by the viscous drag of the fluid. This torque is balanced by a helical spring, and angular deflection is read from a dial or through suitable sensors on a meter or recorder. The amount of torque at a given RPM is indicated in arbitrary degrees Fann, which can be converted into viscosity or apparent viscosity by appropriate calculation.

After initial properties were determined, the samples were hot rolled at 150°F for 16 hours and properties again measured as before. The samples were then static aged in sealed bombs heated to 450°F and pressurized to over 500 psi with nitrogen for 16 hours. The rheological properties of the samples were again measured as above. The pH of the samples was adjusted to 9.0–9.5 with necessary additions of sodium hydroxide to simulate actual alkaline drilling environments and rheological properties again determined.

Table 2–A illustrates the results of this test utilizing mud sample A. As can be seen, the addition of the telomer failed to reduce thermal degradation of this organic treated mud at 450°F after pH adjustment.

TABLE 2-A

|  | Degrees Fann, RPM | | | | | | Gels | | |
| --- | --- | --- | --- | --- | --- | --- | --- | --- | --- |
|  | 600 | 300 | 200 | 100 | 6 | 3 | 10 sec. | 10 min. | pH |
| 0 ppb acrylic telomer: | | | | | | | | | |
| Initial | 23 | 12 | 9 | 5 | 0.5 | 0 | 0.5 | 2 | 7.4 |
| 150° F, 16 hours | 23 | 11.5 | 8 | 4.5 | 0.5 | 0 | 0.5 | 1 | 7.4 |
| 450° F, 16 hours** | — | 135 | 122 | 109 | 98 | 98 | 88 | 102 | *7.1 |
| 450° F, 16 hours** | 64 | 36 | 26 | 15.5 | 5 | 5 | 9 | 42 | *9.1 |
| 3 ppb acrylic telomer: | | | | | | | | | |
| Initial | 40 | 23 | 17 | 10.5 | 2 | 2 | 3 | 6 | 9.7 |
| 150° F, 16 hours | 46 | 26 | 18.5 | 10.5 | 1.5 | 1 | 2 | 3 | 8.6 |
| 450° F, 16 hours** | 143 | 99.5 | 82 | 61 | 27 | 25 | 18 | 52 | *8.1 |
| 450° F, 16 hours** | 113 | 75 | 59 | 41 | 11 | 9 | 5 | 7 | *9.4 |

*Viscometer rotor simply cut hole in samples during testing due to gel-like quality of the samples.
**Thermal degradation noted.

Table 2–B illustrates the results of this test utilizing mud sample B. As can be seen, the addition of the telomer failed to reduce thermal degradation of this mud at 450°F.

also serves to support the scale. After samples were static aged, they were allowed to cool. The tube was

TABLE 2-B

|  | Degrees Fann, RPM | | | | | | Gels | | pH |
|---|---|---|---|---|---|---|---|---|---|
|  | 600 | 300 | 200 | 100 | 6 | 3 | 10 sec. | 10 min. |  |
| 0 ppb acrylic telomer: | | | | | | | | | |
| Initial | 29 | 15 | 10.5 | 5.5 | 1 | 0 | 1 | 3 | 11.8 |
| 150° F, 16 hours | 26 | 14.5 | 9.5 | 5 | 1 | 1 | 1 | 3 | 11.0 |
| 450° F, 16 hours** | 204 | 186 | 175 | 169 | 143 | 106 | — | — | *7.3 |
| 450° F, 16 hours** | — | 286 | 279 | 277 | 182 | 126 | 126 | 123 | *10.7 |
| 3 ppb acrylic telomer: | | | | | | | | | |
| Initial | 44 | 25 | 18 | 11 | 3.5 | 2 | 4 | 8 | 12.4 |
| 150° F, 16 hours | 44 | 24 | 17 | 10 | 1.5 | 1 | 3 | 3 | 11.7 |
| 450° F, 16 hours** | 183 | 160 | 152 | 144 | 123 | 123 | — | — | *8.4 |
| 450° F, 16 hours** | 140 | 117 | 108 | 99 | 84 | 85 | 84 | 110 | *9.7 |

*These muds were so viscous that the rotor simply cut a hole in them during tests.
**Thermal degradation noted.

It should be noted that although the addition of the telomer to the mud samples caused a reduction in Fann readings, these reductions would be considered extremely minimal. The sample would not be considered sufficiently treated to reduce thermal degradation nor would it be successfully utilized in the field.

EXAMPLE III

The present example demonstrates the ability of low molecular weight non-halogen-containing acrylic acid polymers to effectively reduce the thermal degradation of field muds. To selected field muds was, respectively, added a 3 ppb treatment of the polymer made as in Example I (Treatment A), a similar acrylic acid polymer having a slightly higher molecular weight but below 2,500 (Treatment B), and a partially hydrolyzed polyacrylamide product, "Cy-Dril," manufactured by American Cyanamid Company (Treatment C) and used for high temperature extension of drilling fluid. To simulate testing under equivalent drilling conditions, the samples were hot rolled for 36 hours at 150°F after which Fann readings were determined. The samples were then static aged as in Example II at 400°F for 16 hours.

The susceptibility of a fluid to a moving or shearing force is defined as its shear strength. To determine the shear strength of the samples utilized in this example, we utilize the test set forth at page 7 of American Petroleum Institute's "Standard Procedure for Testing Drilling Fluids" (1969). This test utilizes a shearometer which consists of a carefully dimensioned and machined duraluminum tube, a special scale graduated in pounds per 100 sq. ft. of shear, and a sample cup which also serves to support the scale. After samples were static aged, they were allowed to cool. The tube was lowered over the scale support and placed on the quiescent surface of the mud. The tube was allowed to sink into the mud. A stop watch was used to measure the time from the instant the tube is released. After permitting the tube to sink, the reading is taken on the scale directly opposite the top of the shearometer tube and is measured as the shear strength in pounds per 100 square feet corresponding to the elapsed time before the measurement. The higher the number, the less susceptible the sample to shear. If the tube does not penetrate the mud surface, the shear strength is reported as "too high to measure." On the other hand, if the tube sinks to the bottom in 60 seconds or less, the shear strength is zero. Thus, for drilling purposes, the lower the number reported in the shear strength test, the more effective is the drilling fluid. Our tests indicated that use of the acrylic polymer effectively controlled shear strength for satisfactory drilling after exposure to high temperatures and pressures.

The mud utilized in Table 3–A had been treated with 9.6 ppb of a lignosulfonate thinner and was weighted to 17 lbs/gal. The mud utilized in Table 3–B contained 15.4 ppb of a lignosulfonate thinner and was weighted to 18.0 lbs/gal. The mud utilized in Table 3-C contained 15.4 ppb of a lignosulfonate thinner and was weighted to 18 lbs/gal. The tests indicated that there was a substantial reduction in thermal degradation of the mud samples with the non-halogen-containing acrylic acid polymer, providing extension of the utility of the drilling fluid while the polyacrylamide material failed to provide satisfactory protection to the sample against thermal degradation and in one instance, Table 3–C, proved to be as viscous and degraded as the base mud.

TABLE 3-A

AQUEOUS BASE MUD FROM 14,870 ft. DEPTH OF WELL IN VERMILION PARISH, LOUISIANA

|  | Properties after hot rolling treatment (3 ppb) | | | | Properties after static aging treatment (3 ppb) | | | |
|---|---|---|---|---|---|---|---|---|
|  | Base | A | B | C | Base | A | B | C |
| Fann reading: | | | | | | | | |
| 600 | 172 | 145 | 161 | 153 | * | 265 | 277 | **300+ |
| 300 | 95 | 88 | 93 | 90 | * | 213 | 207 | **300+ |
| 200 | 69 | 61 | 68 | 65 | * | 200 | 184 | **300+ |
| 100 | 39 | 36 | 40 | 38 | * | 167 | 152 | 272 |
| 6 | 7 | 7 | 7 | 5 | * | 127 | 112 | 223 |
| 3 | 5 | 5 | 5 | 4 | * | 120 | 112 | 224 |
| Initial gel, lb/100 sq ft | 7 | 6 | 8 | 5 | * | 133 | 140 | 228 |
| 10 min. gel. lb/100 sq ft | 18 | 15 | 16 | 13 | * | 190 | 205 | **300+ |
| pH | 8.6 | 8.7 | 9.0 | 8.8 | — | 8.4 | 7.8 | 8.0 |
| Shear strength—lbs/100 sq ft |  |  |  |  | >10,000 | 950 | 1500 | 2000 |

*Sample too viscous for readings to be taken.
**Readings exceeding limits of Fann Viscometer.

TABLE 3-B

AQUEOUS BASE MUD FROM 15,290 ft. DEPTH OF WELL IN VERMILION PARISH, LOUISIANA

| | Properties after hot rolling treatment (3 ppb) | | | | Properties after static aging treatment (3 ppb) | | | |
|---|---|---|---|---|---|---|---|---|
| | Base | A | B | C | Base | A | B | C |
| Fann reading: | | | | | | | | |
| 600 | 130 | 103 | 108 | 110 | * | 195 | 170 | *300+ |
| 300 | 76 | 56 | 59 | 61 | * | 137 | 102 | 292 |
| 200 | 56 | 40 | 42 | 44 | * | 116 | 78 | 260 |
| 100 | 35 | 23 | 24 | 25 | * | 90 | 50 | 231 |
| 6 | 8 | 4 | 3 | 3 | * | 67 | 29 | 198 |
| 3 | 6 | 3 | 2 | 2 | * | 74 | 16 | 238 |
| Initial gel, lb/100 sq ft | 10 | 3 | 2 | 3 | * | 113 | 36 | 243 |
| 10 min. gel, lb/100 sq ft | 54 | 4 | 4 | 7 | * | 167 | 149 | *300+ |
| pH | 12.2 | 12.2 | 12.3 | 12.2 | — | 11.2 | 10.7 | 10.2 |
| Shear Strength—lbs/100 sq ft | | | | | >10,000 | 4,500 | 950 | 3,100 |

*Too viscous to be determined; thermal degradation noted.

TABLE 3-C

AQUEOUS BASE MUD FROM WELL IN ST. MARY'S PARISH, LOUISIANA

| | Properties after hot rolling treatment (3 ppb) | | | | Properties after static aging treatment (3 ppb) | | | |
|---|---|---|---|---|---|---|---|---|
| | Base | A | B | C | Base | A | B | C |
| Fann reading: | | | | | | | | |
| 600 | 95 | 82 | 95 | 90 | * | 230 | 173 | *300+ |
| 300 | 60 | 49 | 54 | 54 | * | 193 | 136 | *300+ |
| 200 | 47 | 37 | 39 | 39 | * | 177 | 124 | *300+ |
| 100 | 30 | 23 | 23 | 24 | * | 155 | 109 | *300+ |
| 6 | 9 | 4 | 4 | 4 | * | 116 | 80 | *300+ |
| 3 | 5 | 2 | 3 | 3 | * | 115 | 82 | *300+ |
| Initial gel, lbs/100 sq ft | 13 | 5.5 | 4 | 5 | * | 124 | 90 | *300+ |
| 10 min. gel, lbs/100 sq ft | 58 | 28 | 14 | 27 | * | 176 | 137 | *300+ |
| pH | 8.2 | 8.4 | 8.2 | 8.3 | — | 7.7 | 7.9 | 7.4 |
| Shear Strength—lbs/100 sq ft | | | | | >10,000 | 1,200 | 1,050 | 5,000 |

*Too viscous to be determined; thermal degradation noted.

EXAMPLE IV

The present example illustrates the ability of the non-halogen-containing acrylic acid polymer of the present invention to effectively reduce thermal degradation of field muds at increased treatment levels. The mud sample utilized was as in Table 3-B. The acrylic polymer utilized was the same as sample B in Example III. The tests were run as in Example III, with the exception that the treatment level was increased to 6 ppb. The tests concluded that the polymer greatly reduced thermal degradation of the mud sample. The following table further illustrates the results of this test:

TABLE 4

| | Properties after hot rolling | | Properties after static aging | |
|---|---|---|---|---|
| | Base | B | Base | B |
| Fann Reading: | | | | |
| 600 | 130 | 120 | * | 135 |
| 300 | 76 | 67 | * | 82 |
| 200 | 57 | 48 | * | 60 |
| 100 | 36 | 28 | * | 40 |
| 6 | 8 | 3.5 | * | 9 |
| 3 | 7 | 2.5 | * | 8 |
| Initial gel, lbs/100 sq ft | 12 | 3.0 | * | 13 |
| 10 min. gel, lb/100 sq ft | 58 | 5.0 | * | 145 |
| pH | 12.5 | 12.7 | — | 10.5 |

*Too viscous to be determined; thermal degradation noted.

EXAMPLE V

The present example demonstrates the ability of field muds to perform effectively under high temperatures and pressures after treatment with low molecular weight non-halogen-containing polymers. The apparatus utilized was a Model TDL Fann Consistometer, sold by the Fann Instrument Corporation of Houston, Texas. This instrument is designed to test and measure the ability of a test fluid to function under pressures up to 20,000 psi and temperatures of about 450°F. The instrument is fully disclosed in Fann, U. S. Pat. No. 3,073,150. Briefly stated, the consistency or equivalent viscosity of a sample mud in the Fann Consistometer is measured by electrically timing the movement of a soft iron bob which is magnetically pulled up and down in a sample container. Sound signals created by the impingement of the bob inside the container are picked up by a microphone and transmitted to a recorder. The time required to pull the bob through a test fluid is a function of its consistency.

To initiate the test, a mud sample was placed in a stainless-steel cylindrical cell which contained a metal bob. Electromagnets located at both ends of the cell chamber were alternately charged, causing the bob to move up and down through the fluid. The bob's travel time was plotted automatically as the temperatures and pressures inside the cell were increased by utilization of an x-time recorder. The consistency of the fluid in the cell was plotted on the horizontal axis and the temperature and pressure recorded on the vertical axis as the test progressed.

In the present example, a base mud containing a lignosulfonate thinner and utilized in the drilling of a wildcat well in Nueces County, Texas, was first tested in the consistometer. Readings were taken at 30 minute intervals during the test period. The initial reading was 35 centipoises. At the end of almost 3 hours, and after exposing the mud to a temperature of 388°F and 13,650 psi, the test was terminated because the viscosity of the mud was then 100 centipoises, a reading which unquestionably indicated that, based on this test, the mud had been thermally degraded, was viscous, and not utilizable in subterranean drilling operations.

To another sample portion of this base mud was added a 3 ppb treatment of a non-halogen-containing acrylic acid polymer in its sodium salt form. This test was conducted for over 8 hours at temperatures over 400°F and pressures exceeding 15,000 psi. After over 4 hours of testing, the pressure was reduced in order to reduce the possibility of damage to the mechanical test equipment. As can be seen in the data below, this test sample had little susceptibility to viscosity increase caused by high temperatures and pressures.

The following table further illustrates the results of these tests.

TABLE 5

| Base mud | | | | Base mud + 3 ppb polymer | | | |
|---|---|---|---|---|---|---|---|
| Time (Hours) | Pressure (psi) | Temperature (°F) | Viscosity (centipoises) | Time (Hours) | Pressure (psi) | Temperature (°F) | Viscosity (centipoises) |
| 0 | 2000 | 80 | 35 | 0 | 2000 | 78 | 36½ |
| ½ | 3800 | 150 | 15 | ½ | 4000 | 147 | 18 |
| 1 | 6950 | 222 | 13 | 1 | 6500 | 225 | 16½ |
| 1½ | 10000 | 284 | 13½ | 1½ | 7700 | 285 | 16½ |
| 2 | 12600 | 335 | 18 | 2 | 10300 | 330 | 16 |
| 2½ | 13650 | 380 | 55 | 2½ | 10700 | 375 | 15½ |
| 3 | 13650 | *388 | *100 | 3 | 14100 | 415 | 15 |
| | | | | 3½ | 15200 | 430 | 15 |
| | | | | 4 | 15800 | 433 | 14½ |
| | | | | 4½ | 11000 | 435 | 16½ |
| | | | | 5 | 11250 | 436 | 16½ |
| | | | | 5½ | 11200 | 438 | 17 |
| | | | | 6 | 11200 | 441 | 18½ |
| | | | | 6½ | 11100 | 440 | 20½ |
| | | | | 7 | 11200 | 443 | 23½ |
| | | | | 7½ | 11400 | 447 | 27 |
| | | | | 8 | 11500 | 448 | 28 |
| | | | | 8½ | 11600 | 448 | 30½ |

*Test terminated at 158 minutes; sample failed to maintain workable viscosity.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. An aqueous drilling fluid consisting essentially of a water base, a clayey material suspended in said water base, and from about 1 ppb to about 6 ppb of a non-halogen-containing acrylic acid homopolymer or a salt thereof selected from the class consisting of alkali metals and ammonium, said homopolymer having a weight average molecular weight of no more than about 2,500.

2. The aqueous drilling fluid of Claim 1 wherein the said homopolymer is sodium polyacrylate.

3. The aqueous drilling fluid of Claim 1 wherein the said clayey material is bentonite.

4. In the process of drilling a subterranean well wherein there is circulated in the borehole of said well an aqueous drilling fluid containing suspended clayey material, the step of reducing the thermal degradation of said fluid which comprises admixing with said fluid from about 1 ppb to about 6 ppb of a non-halogen-containing acrylic acid homopolymer or a salt thereof selected from the class consisting of alkali metals and ammonium, said homopolymer having a weight average molecular weight of no more than about 2,500, and circulating said fluid throughout said well.

5. The process of Claim 4 wherein the said homopolymer is sodium polyacrylate.

* * * * *